United States Patent
Charny et al.

(10) Patent No.: US 8,264,957 B1
(45) Date of Patent: Sep. 11, 2012

(54) CONTROL OF PREEMPTION-BASED BEAT-DOWN EFFECT

(75) Inventors: Anna Charny, Sudbury, MA (US); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 11/537,276

(22) Filed: Sep. 29, 2006

(51) Int. Cl.
    *H04J 1/16* (2006.01)
(52) U.S. Cl. .................................................. 370/230
(58) Field of Classification Search ............... 370/229, 370/230, 230.1, 231, 232, 233, 234, 235, 370/236, 236.1, 395.43
    See application file for complete search history.

(56) References Cited

U.S. PATENT DOCUMENTS

| | | | | |
|---|---|---|---|---|
| 4,769,810 A * | 9/1988 | Eckberg et al. | ............ | 370/232 |
| 5,530,695 A * | 6/1996 | Dighe et al. | ............ | 370/232 |
| 5,689,499 A * | 11/1997 | Hullett et al. | ............ | 370/235 |
| 5,831,971 A * | 11/1998 | Bonomi et al. | ............ | 370/230 |
| 5,978,356 A * | 11/1999 | Elwalid et al. | ............ | 370/230 |
| 5,978,365 A * | 11/1999 | Yi | ............ | 370/331 |
| 6,247,061 B1 * | 6/2001 | Douceur et al. | ............ | 709/240 |
| 6,356,629 B1 | 3/2002 | Fourie et al. | | |
| 6,424,624 B1 | 7/2002 | Galand et al. | | |
| 6,674,755 B1 | 1/2004 | Potter et al. | | |
| 6,690,645 B1 * | 2/2004 | Aweya et al. | ............ | 370/230 |
| 6,822,940 B1 | 11/2004 | Zavalkovsky et al. | | |
| 6,914,883 B2 * | 7/2005 | Dharanikota | ............ | 370/230.1 |
| 6,967,923 B1 | 11/2005 | Fang | | |
| 7,020,090 B2 | 3/2006 | Chandwadkar et al. | | |
| 7,027,394 B2 * | 4/2006 | Gupta et al. | ............ | 370/230.1 |
| 7,046,631 B1 * | 5/2006 | Giroux et al. | ............ | 370/234 |
| 7,133,360 B2 * | 11/2006 | Le Gouriellec et al. | ...... | 370/229 |
| 7,143,006 B2 | 11/2006 | Ma et al. | | |
| 7,492,779 B2 * | 2/2009 | Schzukin et al. | ............ | 370/412 |
| 7,768,933 B2 * | 8/2010 | Chang et al. | ............ | 370/252 |
| 2001/0030967 A1 * | 10/2001 | Kyusojin et al. | ............ | 370/395 |
| 2002/0071387 A1 * | 6/2002 | Horiguchi et al. | ............ | 370/229 |
| 2002/0089929 A1 * | 7/2002 | Tallegas et al. | ............ | 370/230 |
| 2002/0188648 A1 * | 12/2002 | Aweya et al. | ............ | 709/102 |
| 2003/0152076 A1 * | 8/2003 | Lee et al. | ............ | 370/389 |
| 2003/0214954 A1 * | 11/2003 | Oldak et al. | ............ | 370/400 |
| 2003/0223361 A1 * | 12/2003 | Hussain et al. | ............ | 370/230 |
| 2003/0223362 A1 * | 12/2003 | Mathews et al. | ............ | 370/230 |
| 2004/0022190 A1 * | 2/2004 | Davies et al. | ............ | 370/230 |
| 2004/0202169 A1 * | 10/2004 | Mukouyama et al. | ..... | 370/395.1 |

(Continued)

OTHER PUBLICATIONS

Bader, A., et al., NSIS Networking Group, Internet Draft, entitled RMD-QOSM—The Resource Management in Diffserv QOS Model (draft-ietf-nsis-rmd-07.txt), Jun. 23, 2006, pp. 1-71.

(Continued)

*Primary Examiner* — Kwang B Yao
*Assistant Examiner* — Juvena Loo
(74) *Attorney, Agent, or Firm* — Cesari and McKenna, LLP (57) ABSTRACT

In one embodiment, a node receives packets from one or more input interfaces, and may place the packets in an appropriate output queue for a corresponding output interface. The node may also place received unmarked packets from each of the input interfaces in a corresponding virtual queue of a virtual scheduler for the corresponding output interface. The virtual scheduler may be served at a configured rate, and any unmarked packets in the virtual queue that exceed a configured threshold may be marked.

30 Claims, 5 Drawing Sheets

U.S. PATENT DOCUMENTS

| | | |
|---|---|---|
| 2004/2002158 | 10/2004 | Blair |
| 2005/0175014 A1* | 8/2005 | Patrick ............... 370/395.43 |
| 2005/0195740 A1* | 9/2005 | Kwon ..................... 370/229 |
| 2006/0120286 A1* | 6/2006 | Fan et al. ............... 370/230.1 |
| 2007/0061433 A1* | 3/2007 | Reynolds et al. ......... 709/223 |
| 2007/0223372 A1* | 9/2007 | Haalen et al. ............ 370/229 |
| 2008/0112328 A1* | 5/2008 | Griffiths ................. 370/241 |

OTHER PUBLICATIONS

Briscoe, B., et al., TSVWG Internet Draft, entitled An Edge-To-Edge Deployment Model for Pre-Congestion Notification: Admission Control Over a Diffserv Region (draft-briscoe-tsvwg-cl-architecture-03.txt), Jun. 26, 2006, pp. 1-56.

* cited by examiner

CONTROL OF PREEMPTION-BASED BEAT-DOWN EFFECT

BACKGROUND OF THE INVENTION
TECHNICAL FIELD

The present disclosure relates generally to computer networks, and, more particularly, to flow control and preemption.

BACKGROUND

Various admission control mechanisms (e.g., call admission control, CAC) may be used within a computer network to control the amount of traffic traversing network elements (links/nodes). For example, service providers may limit the number of end-to-end data flows (e.g., Voice over Internet Protocol, VoIP calls) in order to prevent overburdening the network, potentially leading to network congestion. Generally, such admission control may occur at the edges of a service provider's network (e.g., edge-to-edge admission control in a core network) based on the status of the nodes within the network, and may either admit or deny a data flow use of the network, sometimes along a particular selected (admitted) path. Changes in the network, however, such as due to failures, reroutes, etc., may allow data flows to bypass admission control, since the flows are no longer on their originally admitted paths. Also, "flash crowds" (where many new flows are created at substantially the same time) may result in too many flows being admitted before the admission control mechanism can adjust to the increased load. Because of these reasons, some links and nodes within the network may become congested despite the use of admission control.

Generally, all flows sharing a congested network element become affected and suffer potentially substantial Quality of Service (QoS) degradation due to conventional per-packet control, such as dropping individual packets (from all flows) in order to relieve congestion. If the flows are voice flows, then potentially all users may "hang up" if the QoS degradation lasts longer than a few seconds. It is often desirable, therefore, to selectively "preempt" (drop/deny admission for) certain flows to alleviate congestion, and restore the necessary level of QoS for the non-preempted flows. For example, low precedence calls may be preempted to allow higher precedence calls to remain; however the precedence level of calls is not always detectable in the network (e.g., due to security/encapsulation, etc.), thus limiting the use of such selective preemption. Some flow control networks, therefore, perform per-packet processing within the network to determine whether congestion exists, and mark packets that are received at a rate faster than the receiving node can forward over the desired path (or, notably, greater than a "preemption threshold" to prevent reaching the maximum physical rate). Information/feedback about the number of marked packets may be used (e.g., by an ingress node originating the data flows into the core network) to determine how many/which flows to preempt based on the network conditions.

One example solution that attempts to alleviate the occurrence of congestion within the network is described as a Controlled Load (CL) architecture in the Internet Draft by Briscoe, et al., entitled *A Framework for Admission Control over DiffServ using Pre-Congestion Notification* <draft-briscoe-tsvwg-cl-architecture-03.txt>, dated June 2006, which is hereby incorporated by reference in its entirety. As described therein, a token bucket policer may be installed at each hop (e.g., node B) in the network (core), and configured at a desired bandwidth level (e.g., packet rate) after which preemption is triggered. Each core node monitors CL traffic and marks previously unmarked traffic (e.g., using DiffServ Code Point, "DSCP", or an Explicit Congestion Notification, "ECN") exceeding the preemption token bucket. An egress edge node (e.g., node C) measures the amount of unmarked traffic, i.e., packets that traversed the networked without getting marked (or "got through"). The number of packets that "got through" attempts to effectively represent an achievable rate of packets that may traverse the network without congestion. The ingress node (e.g., node A) is informed of this achievable rate, and then decides which flows to preempt (drop) to reduce the number of flows to the achievable rate.

Another example solution that attempts to alleviate the occurrence of congestion within the network is described with a Resource Management in DiffServ (RMD) concept in the Internet Draft by Bader, et al., entitled *RMD-QOSM—The Resource Management in DiffServ QOS Model* <draft-ietf-nsis-rmd-07.txt>, dated June 2006, which is hereby incorporated by reference in its entirety. As described therein, the rate at which flows enter an output queue of a network node is measured such that a degree of overload may be computed. Packets may then be marked so that a number of marked packets leaving the output of the node is proportional to the degree of overload computed. For example, assuming a 10% overload is observed, then 10% of the previously unmarked traffic is marked at the output of the queue. The egress node of the network computes an overall degree of overload and informs the ingress node, which may then preempt any necessary traffic flows.

Yet, there are circumstances where the above solutions may preempt too many flows based on the feedback received. For instance, when there are multiple network elements that are congested within a network, packets from flows may be marked at multiple locations. In this manner, when feedback is returned to the flow control node (e.g., ingress node), the markings reflect congestion that may be worse than what actually exists in the network, and the flow control node may consequently preempt more flows than necessary to alleviate the actual congestion (i.e., the flows have been "beat-down"). For rate-adaptive flows, the beat-down problem is reduced since aggressively reduced (beat-down) rates may be dynamically increased as part of normal rate adaptation. However, in the context of preemption (dropping/denying entire flows), once a flow is preempted, it is no longer operational within the network, and may not return. It is therefore undesirable to beat down flows in a network based on inefficiently marked packets, particularly where preempting only a certain number of flows would alleviate congestion while allowing a greater number of flows to maintain their connectivity and QoS levels.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a node receives packets from one or more input interfaces, and may place the packets in an output queue for a corresponding output interface. The node may also place received unmarked packets from each of the input interfaces in a corresponding virtual queue of a virtual scheduler for the corresponding output interface. The virtual scheduler may be served at a configured rate, and any unmarked packets in the virtual queue that exceed a configured threshold may be marked.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
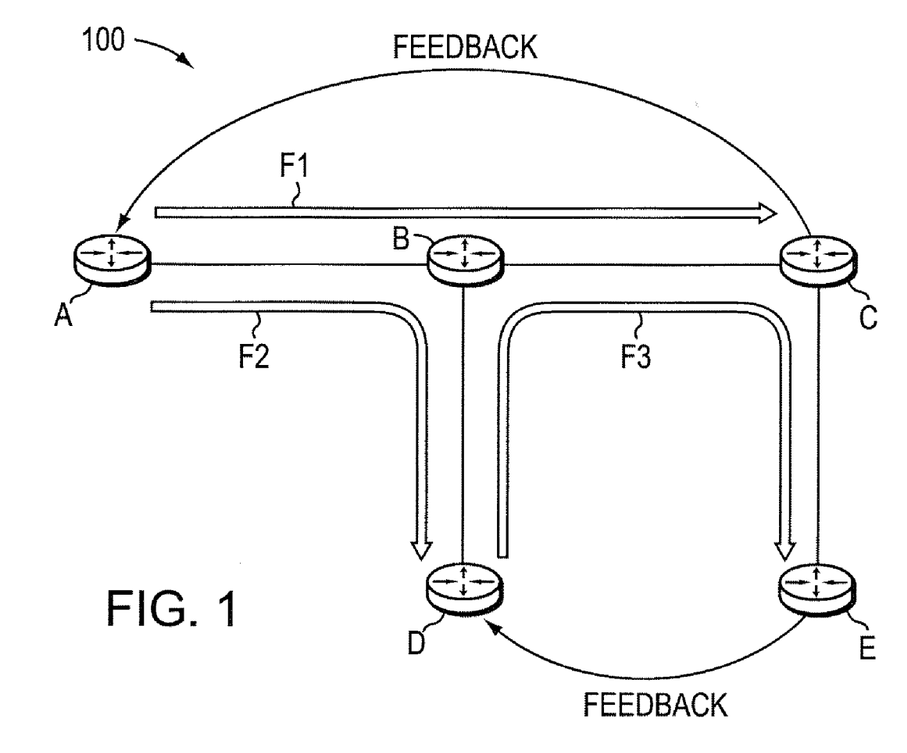
FIG. 1 illustrates an example computer network.

FIG. 1 is a schematic block diagram of an example computer network 100 illustratively comprising nodes (e.g., routers) A-E interconnected by links as shown. Those skilled in the art will understand that any number of nodes, routers, links, etc. may be used in the computer network, and that the view shown herein is for simplicity. Those skilled in the art will also understand that while the present invention is described generally, it may apply to any network configuration within an AS or area, or throughout multiple ASes or areas, etc. Illustratively, nodes A-E may comprise a provider core network, such as, for example, where nodes A, and C-E are provider edge (PE) devices, and node B is a core router. Illustratively, sets of data flows F1-F3 (described below) may each have an ingress into the network 100 and an egress out of the network. For instance, node A may be an ingress for flows of F1 and F2, node C may be an egress for flows of F1, node D may be an egress for flows of F2 and an ingress for flows of F3, and node E may be an egress for flows of F3. Data packets (e.g., within the flows) may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
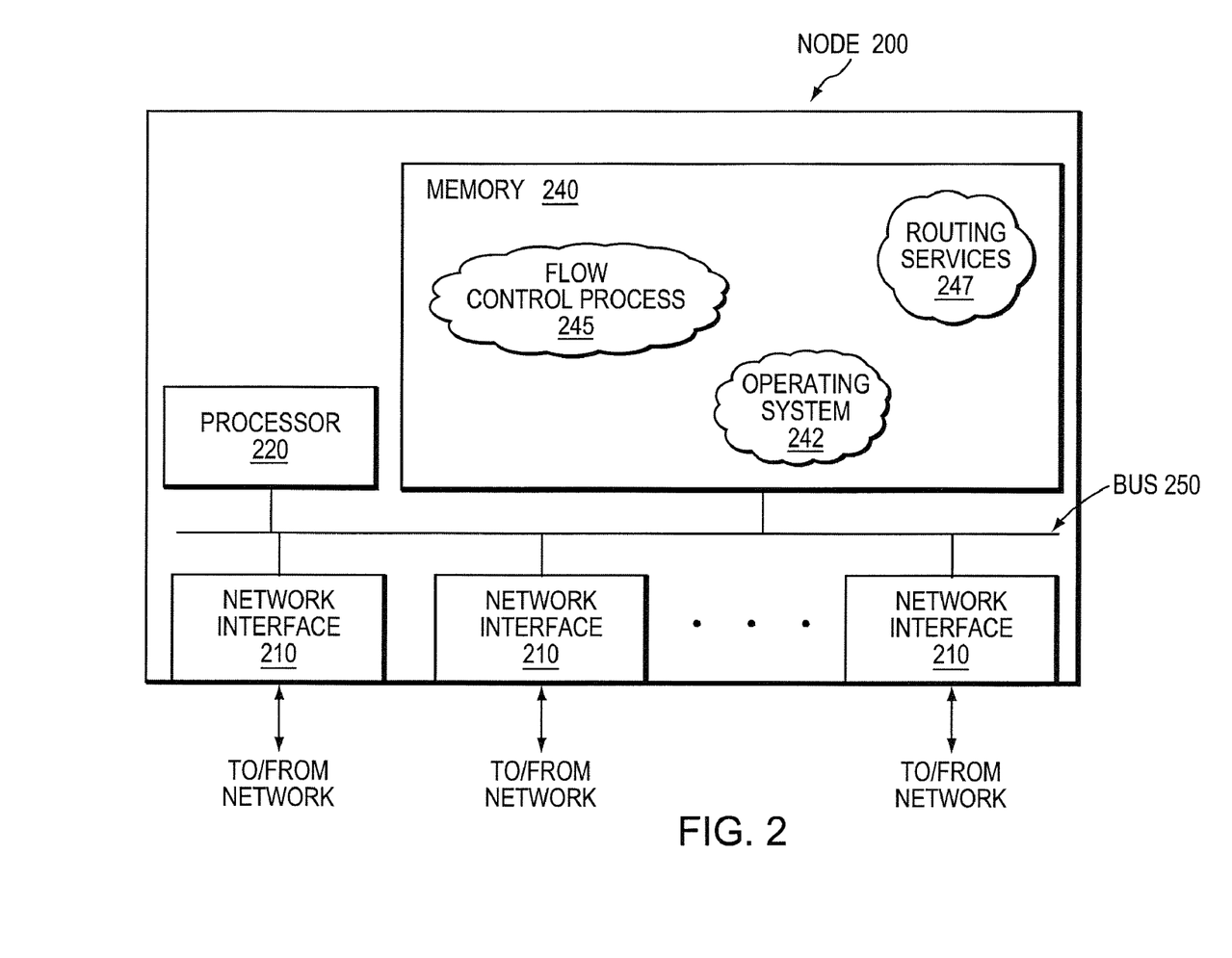
FIG. 2 illustrates an example network device/node.

FIG. 2 is a schematic block diagram of an example node/router 200 that may be advantageously used with one or more embodiments described herein, e.g., as a flow control participating node (for example, nodes A-E above). The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247 and flow control process/services 245, described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for Multi-Protocol Label Switching, etc., each as will be understood by those skilled in the art.

Figure 3:
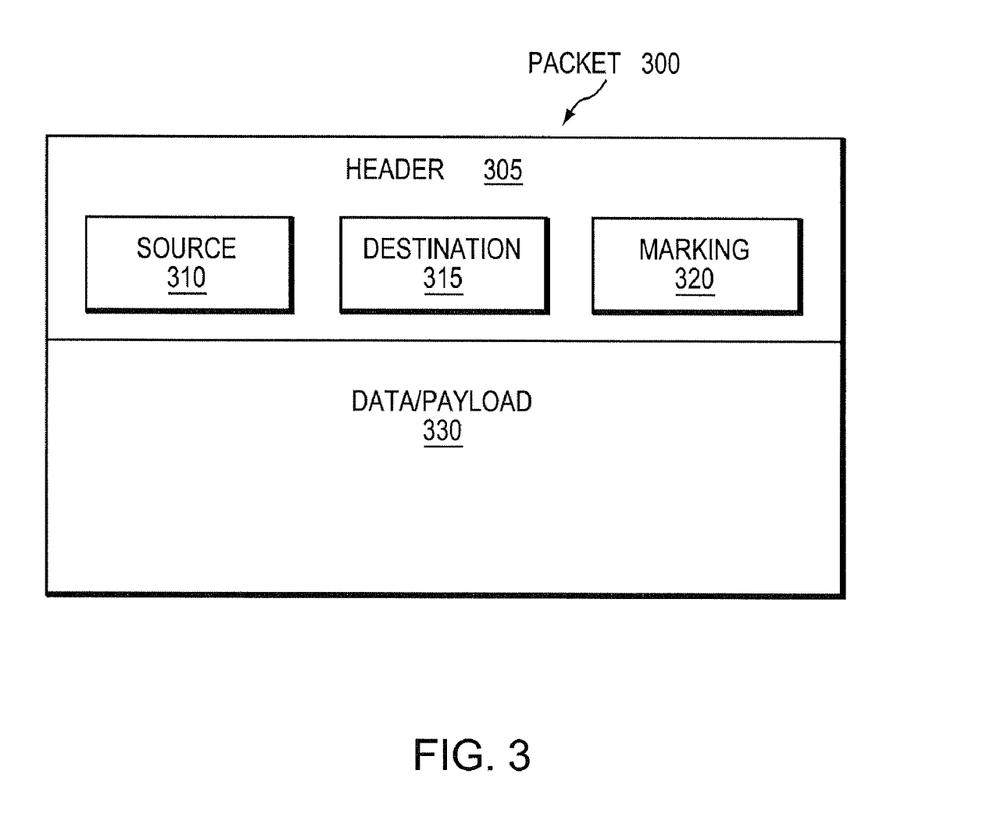
FIG. 3 illustrates an example packet.

FIG. 3 is a schematic block diagram of an example packet 300 that may be used in accordance with one or more embodiments described herein. Packet 300 may comprise a conventional header information field 305, such as an IP header and/or other suitable encapsulation protocol header, as will be understood by those skilled in the art. Source address field 310 contains the originating address of the packet, and destination address field 315 contains the address of the packet's destination. A packet marking field 320 may contain an indication of whether the packet is "marked" for one or more reasons, such as those described here. For example, a packet may be marked by one node, e.g., using one or more flags/bits/values within marking field 320, and another node may read the packet marking in order to make various decisions based on the packet markings, as will be understood by those skilled in the art. Notably, as used herein, a marked packet may be referred to as a packet 300', while an unmarked packet or a packet generally (marked or unmarked) may be referred to simply as a packet 300. Also, data/payload field 330 contains the payload data of the packet, generally relevant to the source and destination of the packet 300.

A set of packets traversing a path through a network between a source and a destination for a particular application may generally define a data flow, such as, e.g., a VoIP call from a sender to a receiver. The flow may traverse the network using a transmission protocol, such as IP, ATM, tunneling/encapsulation, etc., as will be understood by those skilled in the art. There are occasions, however, when too many flows traverse one or more network elements (nodes/links), resulting in congestion, as described above. Prior solutions to alleviate congestion may lead to excessive feedback accumulation over multiple points of congestion through the network, thus resulting in a beat-down problem, where more flows are preempted than necessary to alleviate congestion. In other words, these prior solutions fail to account for traffic already marked at previous congestion points, which, for example, may lead to potentially too much marked traffic at a merge point, and potentially too little marked traffic at a diverge point.

As an example of a beat-down problem, suppose that a set of flows traverses two congested links. The first link has an overload equal to twice as much as the link can support ("2×" overload), so 50% of the traffic going to the second link is marked. The second link also has 2× overload, so ideally it also needs to have 50% of the traffic marked at its output. However, since the marking scheme generally measures both marked and unmarked traffic, it concludes that it needs to mark every other packet. If the packets are marked randomly with the desired probability (in this case 50%, or ½), then half of the previously unmarked packets are marked. Since the previously marked packets are not remarked, the combined amount of marked packets over the two links is 75% instead of the desired 50%. Notably, while this example assumes random marking, if the marking is deterministic, then every other packet is marked. Therefore, depending on the parity of the packets that are marked, either 100% of the traffic is marked, or 50% (the correct number). That is, if all even packets are marked on the first link and all odd packets are marked on the second link, 100% of the packets is marked (i.e., traffic flows are beat-down).

One enhancement to the above example is to account for the amount of traffic already marked, and to subsequently provide only incremental marking. For example, one could measure the overload of previously unmarked traffic only, and mark only the previously unmarked traffic based on this overload in proportion with the "unmarked overload." However, this enhancement does not fully solve the problem. For instance, consider the case as shown in FIG. 1 where a set of flows F1 traverses links A-B-C, a set of flows F2 traverses the link A-B and exit (to node D), and a set of flows F3 traverses the link B-C and exit (to node E). Assume that the rates of all sets of flows are equal, and that each link has 2× overload. (Note that the overload may be computed with regard to a desired threshold rather than a maximum link speed, so in this example, a 2× overload may not cause packet loss at a first hop, e.g., node A, so a second hop, e.g., node B, will be equally overloaded.)

Assume further that the overload occurs when F1 is rerouted onto A-B-C due to a failure elsewhere in the network 100, but prior to that F2 and F3 load the corresponding links to the desired threshold, but without overloading the preemption capacity. After F1 has been rerouted, and assuming random marking, node A marks packets of F1 with a probability of ½, and packets of F2 with a probability of ½. Since F2 does not traverse link B-C, at the second point of congestion node B perceives on its input half of F1 packets marked, and initially no F3 packets marked. Assuming it correctly measures overload only of the previously unmarked traffic (that is, assuming the enhancement above has been applied), node B may conclude that it has 1.5×"unmarked" overload, and may therefore mark previously unmarked packets with a probability of ⅓. As a result, ⅓ of F3 is marked, and ⅓ of the previously unmarked F1 traffic (½ of F1) is marked (i.e., an additional ⅙ of F1) by node B.

The egress nodes of the network (e.g., nodes C, D, and E) then detect ½ overload of F2, which leads to ½ of F2 traffic being preempted/dropped. Similarly, ⅓ of F3 is dropped and (½+⅙)=⅔ of F1 is dropped, thus resulting in ⅓ of F1 remaining. Thus, utilization of link A-B is (⅓+½)=⅚ of the desired threshold. Therefore, although link B-C is 100% utilized, the link A-B is not, which results in less transmitted traffic than could be allowed in this case. This problem can be made worse in a longer chain of congestion points, as each consequent congestion point in the chain will "beat down" the long-haul traffic further, accumulating underutilization on all of the links in the chain but the very last one.

Beat-Down Control

According to embodiments of the disclosure, a node receives packets from one or more input interfaces, and may place the packets in an output queue for a corresponding output interface. The node may also place received unmarked packets from each of the input interfaces in a corresponding virtual queue of a virtual scheduler for the corresponding output interface. The virtual scheduler may be served at a configured rate, and any unmarked packets in the virtual queue that exceed a configured threshold may be marked.

Figure 4:
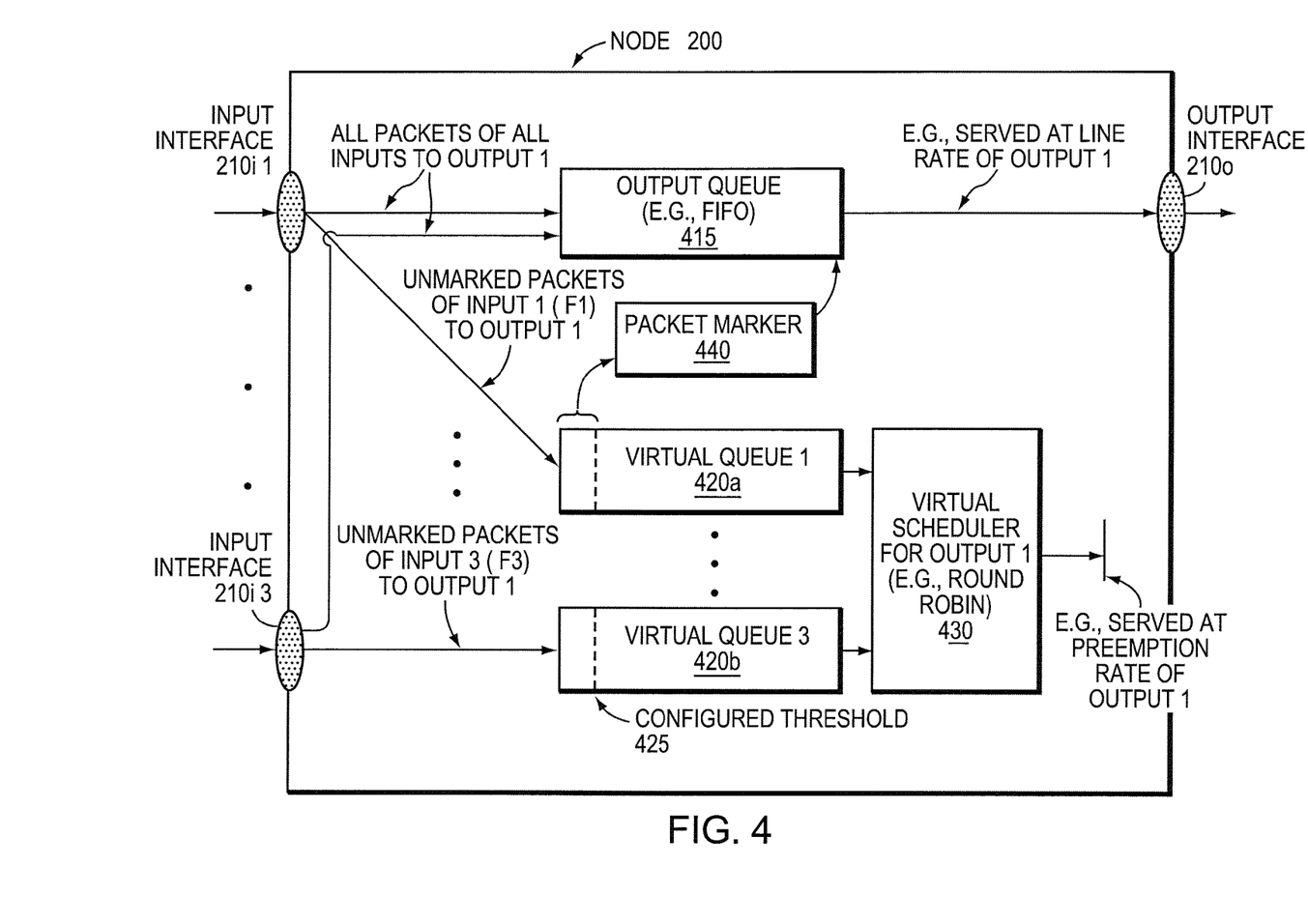
FIG. 4 illustrates an example network device/node.

FIG. 4 is a partial block diagram of an example, node/router 200 illustrating various components and their interrelations. Node 200 may comprise one or more input interfaces 210i (e.g., 210i1 and 210i3) and one or more output interfaces 210o, the latter illustratively labeled an "output 1" as shown. Packets 300 and 300' received on any input interfaces 210i from any flows that are destined to the same output interface 210o (e.g., output 1) enter an output queue 415, e.g., a conventional first-in-first-out (FIFO) queue. For example, if node/router 200 is node B from FIG. 1 above, a set of flows corresponding to F1 may be received on input interface 210i1 and a set of flows corresponding to F3 may be received on input interface 210i3 (e.g., from node A and node D), both destined to node C via output 1. The output queue 415 may be served at an output line rate (e.g., maximum physical rate packets can be sent out the output interface 210o), or at another configurable rate, such as, e.g., a preemption rate. Notably, by using a preemption rate, packet flow may be controlled prior to exceeding the physical limits of the node (e.g., the output interface), thus resulting in fewer dropped/lost packets, as will be understood by those skilled in the art.

To alleviate the beat-down problem (e.g., for the CL architecture described above), node 200 may be configured (e.g., in relation with flow control process/services 245 of FIG. 2 above) with a virtual queue 420 for each set of input flows (e.g., F1 and F3) at the corresponding output interface 210o (e.g., output 1). For instance, unmarked packets 300 from F1 may enter a virtual queue 420a for F1 corresponding to output 1. Also, unmarked packets 300 from F3 may enter a virtual queue 420b for F3 also corresponding to output 1. A virtual queue may generally be defined as an emulation of a queue in a scheduler operating (serving its queues) at a particular rate.

Illustratively, this rate is controlled by a virtual scheduler 430 for the particular output interface 210o (output 1), which may serve the virtual queues 420 at a configured rate for that output, e.g., the preemption rate. Also illustratively, the virtual scheduler may be a round robin scheduler, as will be understood by those skilled in the art. For instance, the virtual scheduler 430 serves the virtual queues 420 one at a time in a particular order, and repeats when the end of virtual queues 420 is reached (e.g., for the two virtual queues shown, the scheduler will alternate serving each virtual queue). A virtual round robin scheduler, notably, may closely approximate a max-min fair local computation. Alternatively, the virtual scheduler may also be other suitable schedulers, such as, e.g., a Fair Queuing scheduler, as will also be understood by those skilled in the art. Moreover, because the virtual queues 420 and virtual scheduler 430 are virtual, "serving" denotes that the virtualized packets are simply removed from the queue (i.e., not actually sent to an output interface 210o).

To determine which packets to mark, each virtual queue 420 of a particular output interface (e.g., output 1) has a configured threshold 425. As the virtualized unmarked packets 300 arrive, they enter the corresponding virtual queue 420 if the depth of the virtual queue is below its configured threshold 425. If a packet 300 enters the virtual queue, it then remains unmarked. If, however, the packet finds the virtual queue full (e.g., its depth has reached the configured threshold), then the packet is marked (e.g., by packet marker 440) and is not placed in the virtual queue. Thus, only unmarked packets enter the virtual queues. The virtual scheduler 430 operates at the configured (preemption) rate to empty the packets from the virtual queues. This ensures that the rate of unmarked packets corresponds to the fair rate of the corresponding virtual queue, whereas packets exceeding that fair rate are marked. In this way, the virtual (e.g., round robin) scheduler attempts to distribute marking of packets between the input interfaces (e.g., F1/210i1 and F3/210i3) in such a way as to allocate a fair share of unmarked packets to each, while marking packets that exceed the fair rate. By marking packets in this manner, therefore, the beat-down problem may be alleviated accordingly for many network configurations.

The example below may be used to demonstrate the beat-down control of one or more embodiments of the disclosure. For instance, assume the example above with sets of flows F1 and F3 entering respective input interfaces on node B that are destined for node C (e.g., out the output interface 210o of output 1). The preemption rate/threshold of the output interface 210o is "rate-c", above which all packets should be marked. Thus, the rate-c is configured as the rate of the virtual scheduler 430. Marked packets 300' for F1 ("F1.$m$") and F3 ("F3.$m$") arrive at the respective input interfaces 210i1 and 210i3, along with unmarked packets 300 for F1 ("F1.0") and F3 ("F3.$u$"), and all physical packets from the input interfaces enter output queue 415. The unmarked packets F1.0 are also directed to a corresponding virtual queue 420a, and unmarked packets F3.0 are also directed to another corresponding virtual queue 420b (sharing the same virtual scheduler 430).

In the event the combination of unmarked packets F1.0+F3.0 is received at a rate that is less than rate-c, no unmarked packets need to be marked (i.e., the output interface 210o is not congested in the sense that its preemption threshold is not exceeded). In the event, however, that F1.0+F3.0 is greater than rate-c (i.e., unmarked packets are received at input interfaces at a rate greater than can be handled by the output interface), the output interface 210o is congested. If the rates at which F1.0 and F3.0 packets are received are both greater than rate-c/2, the excess rate of each input-output aggregate over its fair share would be additionally marked by packet marker 440, i.e., such that the total amount of unmarked traffic leaving the output interface is substantially equal to (or less than) rate-c. Note that the total amount of marked traffic may now be substantially equal to the newly marked packets in addition to any previously marked packets.

Now assume that F1.0 packets are received at a rate that is 0.5*rate-c and that F3.0 packets are received at rate-c. Here, F1.0 and F3.0 packets are received at an aggregate rate that is greater than rate-c, but now F3.0 packets are received at a rate greater than their fair share (with respect to F1.0 packets). The virtual (round robin) scheduler 430 passes all of F1.0 packets unmarked (i.e., virtual queue 420a does not exceed the threshold 425). However, 0.5*rate-c of F3.0 traffic in virtual queue 420b exceeds the threshold 425, and thus is marked by packet marker 440 (i.e., 0.5*rate-c of F3.$u$ and 0.5*rate-c of F1.0 passes unmarked, which equals 1.0*rate-c).

In both situations above, if packets of F1 had previously been marked (e.g., at node A), node B need not re-mark those packets even though they may actually congest node B, since the marked packets 300' (F1.$m$) have already been accounted for, and should lead to an appropriate preemption of flows accordingly. In other words, the embodiments described herein provide a manner to determine an amount of traffic that needs to be preempted to alleviate congestion, without causing a beat-down problem.

In accordance with embodiments described herein, then, the marked packets 300' and unmarked packets 300 from the sets of flows (e.g., F1 and F3) reach an egress node of the network 100 (e.g., node C and node E, respectively). The egress(es) may be configured to determine (decide) which flows in particular to preempt at corresponding ingress(es) (e.g., specific flows of F1 or F3) based on the packet markings to reduce network congestion, and may send this feedback to the appropriate ingress nodes (e.g., node A and node D, respectively). Alternatively, the egress(es) may simply inform the appropriate ingress(es) of the packet markings (e.g., ratios, values, etc.), and the ingress(es) may decide which flows to preempt. In either case, each set of flows, then, may have a certain number of particular flows preempted that reduces network congestion without beating down the number of flows beyond what may be necessary. Notably, which flows to preempt may be a local decision to the deciding node (egress/ingress), and may be based on a number of factors, e.g., random selection, older/newer flows, larger/smaller flows, higher/lower priority flows, etc.

Illustratively, in contrast to the above-mentioned beat-down problem example, the embodiments described herein preempt only those flows necessary to alleviate/reduce network congestion. For example, where before only ⅚ of the threshold of link A-B was utilized (i.e., because of beat-down of flows), now 100% of the threshold of link A-B is utilized, in particular, in the example solution above where no further packets from flows F1 on the corresponding input interface are marked at node B. On the other hand, in the example solution above where packets of flows F1 are marked at node B, only a sufficient amount of traffic (flows) necessary to alleviate congestion are preempted, such that while not all links of the network are 100% utilized, no links are over-utilized (congested), and substantially no links are "under-utilized" either. Thus, according to one or more embodiments described herein, the network as a whole may operate as fully as possible (i.e., no beat-down) given the ingress-egress flows traversing the links therein, without congesting any of those links. In particular, the beat-down problem may be substantially alleviated in a network where traffic merges/converges and/or branches/diverges at various nodes, allowing for more efficient (and complete) use of network resources.

Moreover, in accordance with one or more embodiments described herein, it may be beneficial to configure the nodes of the network to preferentially drop marked packets 300' prior to dropping unmarked packets 300 in the event a packet must be dropped (e.g., due to exceeding physical limitations of the node). For instance, if packets are dropped regardless of their marking, the techniques described herein may become less effective. Therefore, by dropping marked packets before unmarked packets, the general integrity of these techniques may be maintained. Alternatively, one or more embodiments described herein may be adjusted to drop all packets that are to be marked, thus removing the need to distinguish between marked and unmarked packets. While this may, on occasion, result in too many dropped packets until the feedback is received to adjust flows, this temporary packet-based beat-down may be acceptable in certain circumstances.

Figure 5:
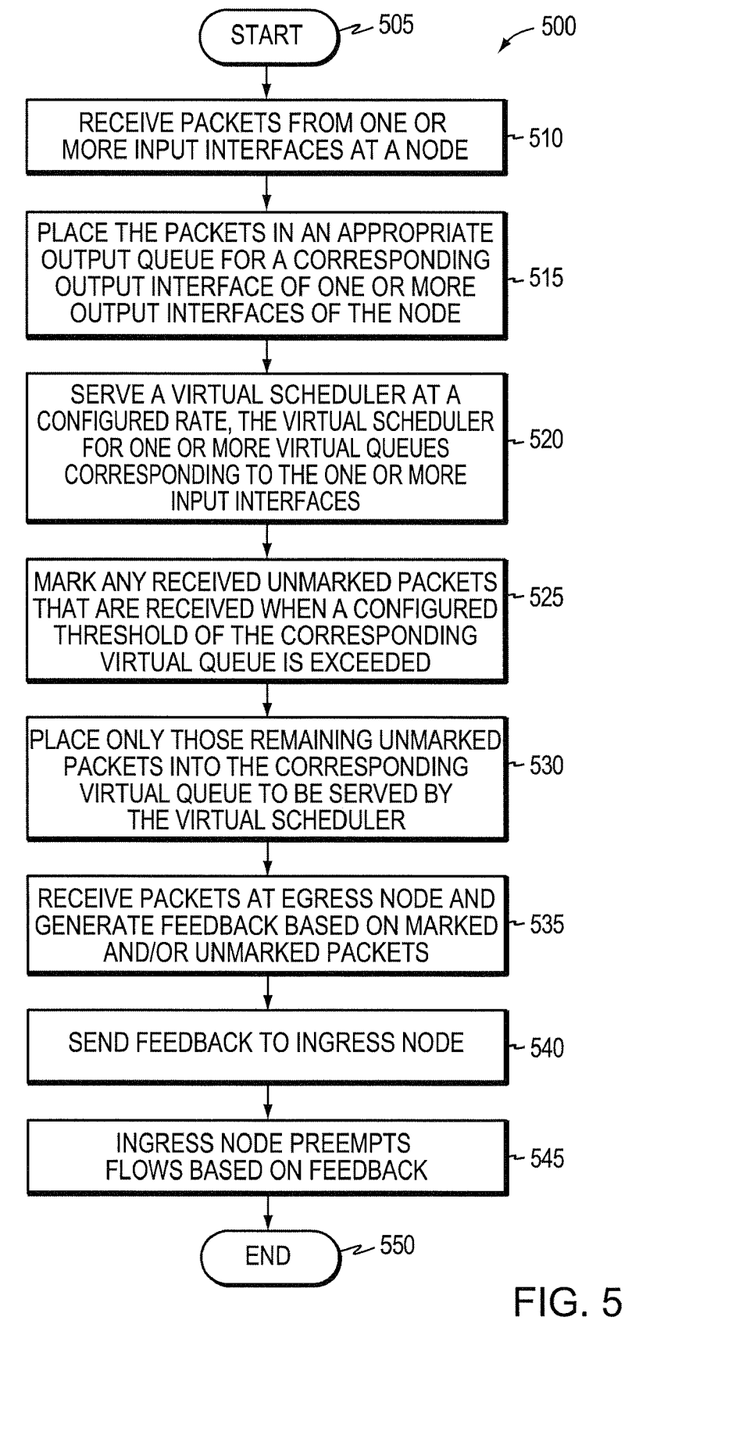
FIG. 5 illustrates an example procedure for beat-down control.

FIG. 5 illustrates an example procedure for beat-down control in accordance with one or more embodiments described herein. The procedure 500 starts at step 505, and continues to step 510, where a node 200 (e.g., a core node B) receives packets (300 and/or 300') from one or more input interfaces 210*i*, for example, F1 flows on 210*i*1 and F3 flows on 210*i*3. The node places the packets (marked and unmarked) in an appropriate output queue 415 for a corresponding output interface 210*o* in step 515. A virtual scheduler 430 is served at a configured rate (e.g., the preemption threshold rate) in step 520, where the virtual scheduler is for one or more virtual queues (420*a* and 420*b*) corresponding to the one or more input interfaces. In step 525, any received unmarked packets 300 that are received when a configured threshold 425 of the corresponding virtual queue is exceeded are marked (e.g., by packet marker 440) into marked packets 300'. Notably, as mentioned above, previously marked and newly marked packets 300' are not placed in the virtual queue 420 such that they are not included in the queue length. Only those remaining unmarked packets 300 are placed into the corresponding virtual queue in step 530 to be served by the virtual scheduler.

The actual (physical) unmarked and marked packets are forwarded from the output 210*o*, and eventually an egress node (e.g., node C) receives the packets at step 535 and generates feedback based on marked and/or unmarked packets as described above. In step 540, the feedback is sent to an ingress node (e.g., node A for F1 and node D for F3), or notably, another flow control node, where the feedback may be, e.g., either an indication of which flows to preempt, or simply an indication of the amount of traffic to preempt, as mentioned above. The ingress node(s) may then preempt flows from the sets of flows as necessary in step 545 based on the feedback. The procedure 500 then ends in step 550. Notably, while the procedure illustratively ends for the packets received in step 510, the procedure 500 continues to maintain and update the feedback based on packets continually received at step 510.

Advantageously, the novel techniques described herein control preemption-based beat-down problems in a computer network. By providing a virtual per-input scheduler as described herein, the novel techniques approximate packet marking based on max-min fair allocation on a per-input (interface) basis, thus reducing or eliminating the beat-down problem. Also, the dynamic aspects of one or more embodiments described herein alleviate the need for cumbersome and inefficient manual configuration.

While there have been shown and described illustrative embodiments that control preemption-based beat-down problems in a computer network, it is to be understood that various other adaptations and modifications may be made within the spirit and scope of the present invention. For example, the embodiments have been shown and described herein with reference to a network of core routers. However, the embodiments of the invention in its broader sense are not so limited, and may, in fact, be used with any set of nodes/routes involved with flow control, as will be understood by those skilled in the art. Also, while the term "input interface" has been generally used herein to describe a physical interface, one or more embodiments described herein are also equally applicable to logical/virtual interfaces (e.g., per virtual local area network (VLAN) interfaces, channelized interfaces, virtual channels, logical channels, etc.), as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving previously marked and previously unmarked packets at a node from one or more input interfaces, the marked and previously unmarked packets associated with two or more flows;
   placing the previously marked and the previously unmarked packets from each of the input interfaces in an output queue corresponding to an output interface of the node;
   placing previously unmarked packets from each of the input interfaces in a plurality of virtual queues of a virtual scheduler, each previously unmarked packet placed in a virtual queue of the plurality of virtual queues that corresponds to both a flow of the two or more flows to which the previously unmarked packet belongs and the output interface, such that previously unmarked packets of different flows destined for the same output interface are placed in different virtual queues;

serving the virtual scheduler at a configured rate;
marking any previously unmarked packets associated with a virtual queue of the plurality of virtual queues when a number of unmarked packets in that virtual queue exceeds a configured threshold of that virtual queue; and
not placing marked packets in the plurality of virtual queues.

2. The method as in claim 1, further comprising:
performing round robin scheduling at the virtual scheduler.

3. The method as in claim 1, further comprising:
performing Fair Queuing scheduling at the virtual scheduler.

4. The method as in claim 1, wherein the one or more input interfaces comprise either physical or logical interfaces.

5. The method as in claim 1, wherein the configured rate is a preemption threshold rate.

6. The method as in claim 1, further comprising:
forwarding the packets from the output interface; and
receiving the packets at an egress node.

7. The method as in claim 6, further comprising:
deciding, at the egress node, which flows to preempt based on markings of the received packets; and
sending a list of the flows to preempt to a flow control node.

8. The method as in claim 6, further comprising:
generating feedback at the egress node based on markings of the received packets;
sending the feedback to a flow control node; and
deciding, at the flow control node, which flows to preempt based on the feedback.

9. The method as in claim 8, wherein the step of sending the feedback to the flow control node comprises sending the feedback to an ingress node.

10. The method as in claim 1, wherein each virtual queue of the plurality of virtual queues has a same configured threshold.

11. The method as in claim 1, further comprising:
dropping marked packets prior to dropping unmarked packets.

12. The method as in claim 1, further comprising:
dropping marked packets at the node.

13. A node, comprising:
one or more input interfaces adapted to receive previously marked and previously unmarked packets from two or more packet flows;
one or more output interfaces;
an output queue corresponding to each of the output interfaces, each output queue adapted to receive previously marked and the previously unmarked packets from the one or more input interfaces;
a virtual scheduler corresponding to each of the output interfaces, the virtual scheduler adapted to be served at a configured rate; and
a plurality of virtual queues, each virtual queue corresponding to both a flow of the two or more of flows and to the output interface, each virtual queue configured to queue previously unmarked packets of the corresponding flow when a number of unmarked packets in that virtual queue is less than a configured threshold of that virtual queue and to mark any previously unmarked packets when a number of unmarked packets in that virtual queue exceeds the configured threshold of that virtual queue, wherein the virtual queues are adapted to contain only unmarked packets.

14. The node as in claim 13, wherein the virtual scheduler is a round robin scheduler.

15. The node as in claim 13, wherein the virtual scheduler is a Fair Queuing scheduler.

16. The node as in claim 13, wherein the configured rate is a preemption threshold rate.

17. The node as in claim 13, wherein all of the virtual queues of an output interface have a same configured threshold.

18. The node as in claim 13, wherein the one or more input interfaces are physical interfaces.

19. The node as in claim 13, wherein the one or more input interfaces are logical interfaces.

20. An apparatus, comprising:
means for receiving previously marked and previously unmarked packets at a node from one or more input interfaces, the marked and previously unmarked packets associated with two or more flows;
means for placing the previously marked and the previously unmarked packets from each of the input interfaces in an output queue corresponding to an output interface of the node;
means for placing previously unmarked packets from each of the input interfaces in a plurality of virtual queues of a virtual scheduler, each previously unmarked packet placed in a virtual queue of the plurality of virtual queues that corresponds to both a flow to which the previously unmarked packet belongs and the output interface, such that previously unmarked packets of different flows destined for the same output interface are placed in different virtual queues;
is means for serving the virtual scheduler at a configured rate;
means for marking any previously unmarked packets associated with a virtual queue of the plurality of virtual queues when a number of packets in that virtual queue exceeds a configured threshold of that virtual queue; and
means for not placing marked packets in the plurality of virtual queues.

21. The method as in claim 1, wherein previously marked packets include an indication of congestion by another node.

22. A method, comprising:
receiving a plurality of packets of a plurality of flows at a node on one or more input interfaces, the plurality of packets including both previously marked packets that include an indication of congestion placed in the packets by another node and unmarked packets that do not include an indication of congestion;
placing both the previously marked packets and the previously unmarked packets of the plurality of packets in an output queue corresponding to an output interface of the node;
placing only the previously unmarked packets of the plurality of packets in a plurality of virtual queues, each previously unmarked packet placed in a virtual queue of the plurality of virtual queues that corresponds to both a flow to which the previously unmarked packet belongs and the output interface, such that previously unmarked packets of different flows are placed in different virtual queues;
serving the plurality of virtual queues at a configured rate;
determining a number of unmarked packets in one of the virtual queues exceeds a configured threshold of that virtual queue;
marking to include an indication of congestion any additional previously unmarked packets of the plurality of packets associated with that virtual queue that are received once that virtual queue exceeds the configured threshold and not placing the additional previously unmarked packets in that virtual queue; and forwarding the plurality of packets from the output queue on the output interface of the node.

23. The method as in claim 22, further comprising;
subsequent to the marking, placing remaining received previously unmarked packets that are not marked into a corresponding virtual queue.

24. The method as in claim 22, wherein the plurality of packets originate from one or more ingress nodes and are forwarded toward one or more egress nodes.

25. The method as in claim 24, further comprising:
deciding, at a particular egress node, a flow to preempt based on the indications of congestion in marked packets of that flow received at that egress node.

26. The method as in claim 24, further comprising:
generating feedback for a flow at a particular egress node based on markings of the received packets of that flow received at that egress node;
sending the feedback from the egress node to a flow control node; and
deciding, at the flow control node, which flow to preempt based on the feedback from the egress node.

27. The method as in claim 26, wherein the flow control node is the ingress node for the flow.

28. A node comprising:
one or more input interfaces configured to receive a plurality of packets of a plurality of flows, the plurality of packets including both previously marked packets that include an indication of congestion placed in the packets by another node and unmarked packets that do not include an indication of congestion;
an output interface configured to forward the plurality of packets;
an output queue corresponding to the output interface, the output queue configured to queue both the previously marked packets and the previously unmarked packets of the plurality of packets;
a plurality of virtual queues, each virtual queue corresponding to both a flow of the plurality of flows and to the output interface, each virtual queue configured to queue previously unmarked packets of the plurality of packets of the corresponding flow, such that previously unmarked packets of different flows are queued in different virtual queues; and
a virtual scheduler corresponding to the output interface and associated with the virtual queues, the virtual scheduler configured to serve the virtual queues at a configured rate,
wherein the virtual queues are configured such that when one of the virtual queues exceeds a configured threshold of that virtual queue, any additional previously unmarked packets of the plurality of packets associated with the virtual queue that are received are marked to include an indication of congestion and not placed in that virtual queue.

29. The node as in claim 28, wherein the virtual queues are configured to queue remaining received previously unmarked packets in a corresponding virtual queue.

30. The node as in claim 28, wherein the plurality of packets originate from one or more ingress nodes and are forwarded toward one or more egress nodes.

* * * * *

UNITED STATES PATENT AND TRADEMARK OFFICE
CERTIFICATE OF CORRECTION

PATENT NO. : 8,264,957 B1
APPLICATION NO. : 11/537276
DATED : September 11, 2012
INVENTOR(S) : Anna Charny Page 1 of 1

It is certified that error appears in the above-identified patent and that said Letters Patent is hereby corrected as shown below:

In the Claims:

Col. 12, line 29, claim 20 should read: "is-means for serving the virtual scheduler at a configured"

Signed and Sealed this
Twenty-first Day of May, 2013

Teresa Stanek Rea
*Acting Director of the United States Patent and Trademark Office*